US010684820B2

(12) United States Patent
Spalter et al.

(10) Patent No.: US 10,684,820 B2
(45) Date of Patent: Jun. 16, 2020

(54) SYSTEMS AND METHODS FOR COMMUNICATING FEEDBACK

(71) Applicant: Facebook, Inc., Menlo Park, CA (US)

(72) Inventors: Ian Spalter, San Mateo, CA (US); Michel Krieger, San Francisco, CA (US); Ian McIntyre Silber, San Jose, CA (US); Baback Elmieh, Palo Alto, CA (US); John Russell Whaley, San Jose, CA (US); Rex Crossen, Oakland, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 15/707,799

(22) Filed: Sep. 18, 2017

(65) Prior Publication Data

US 2019/0087151 A1    Mar. 21, 2019

(51) Int. Cl.
G10L 13/00       (2006.01)
G06F 3/16        (2006.01)
G06F 3/0481      (2013.01)
G06Q 50/00       (2012.01)
H04N 21/2187     (2011.01)

(52) U.S. Cl.
CPC ............ G06F 3/167 (2013.01); G06F 3/0481 (2013.01); G06Q 50/01 (2013.01); H04N 21/2187 (2013.01)

(58) Field of Classification Search
USPC .................................................. 704/257–275
See application file for complete search history.

(56) References Cited

U.S. PATENT DOCUMENTS

| | | | | |
|---|---|---|---|---|
| 8,997,006 B2* | 3/2015 | Whitnah | .................. | H04L 51/32 715/203 |
| 9,872,076 B1* | 1/2018 | Lewis | ................. | H04N 21/4788 |
| 10,063,600 B1* | 8/2018 | Marsh | ................. | H04L 65/1089 |
| 2006/0095265 A1* | 5/2006 | Chu | ...................... | G10L 13/033 704/268 |
| 2013/0103814 A1* | 4/2013 | Carrasco | ............. | H04L 65/4015 709/223 |
| 2014/0004951 A1* | 1/2014 | Kern | ....................... | A63F 13/86 463/42 |
| 2018/0053224 A1* | 2/2018 | McClave | ........... | G06Q 30/0201 |

* cited by examiner

Primary Examiner — Jesse S Pullias
(74) Attorney, Agent, or Firm — Sheppard Mullin Richter & Hampton LLP

(57) ABSTRACT

Systems, methods, and non-transitory computer-readable media can determine that one or more viewers of a live content stream selected at least one option for interacting with a broadcaster of the live content stream; determine audio-based feedback corresponding to the selected option; and provide the audio-based feedback to be outputted to the broadcaster through an audio device.

20 Claims, 7 Drawing Sheets

500

Determine that one or more viewers of a live content stream selected at least one option for interacting with a broadcaster of the live content stream
502

Determine audio-based feedback corresponding to the selected option
504

Provide the audio-based feedback to be outputted to the broadcaster through an audio device
506

US 10,684,820 B2

SYSTEMS AND METHODS FOR COMMUNICATING FEEDBACK

FIELD OF THE INVENTION

The present technology relates to the field of content broadcasting. More particularly, the present technology relates to techniques for broadcasting live content.

BACKGROUND

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

SUMMARY

Various embodiments of the present disclosure can include systems, methods, and non-transitory computer readable media configured to determine that one or more viewers of a live content stream selected at least one option for interacting with a broadcaster of the live content stream; determine audio-based feedback corresponding to the selected option; and provide the audio-based feedback to be outputted to the broadcaster through an audio device.

In an embodiment, the option for interacting with the broadcaster includes at least one of: a like option, a reaction option, a comment option, or a share option.

In an embodiment, the live content stream is broadcasted through a social networking system.

In an embodiment, the audio device is paired with a computing device being operated by the broadcaster.

In an embodiment, the live content stream is being broadcasted through the computing device.

In an embodiment, the systems, methods, and non-transitory computer readable media are configured to perform determining that a threshold number of users selected at least one different option for interacting with the broadcaster; and providing different audio-based feedback to be outputted to the broadcaster through the audio device, the different audio-based feedback being associated with the different option.

In an embodiment, the systems, methods, and non-transitory computer readable media are configured to perform determining that the broadcaster has selected at least one different option to interact with viewers of the live content stream; and providing different audio-based feedback to be outputted through computing devices being operated by the viewers, the different audio-based feedback being associated with the selected different option.

In an embodiment, the response option is selected through the audio device.

In an embodiment, the systems, methods, and non-transitory computer readable media are configured to perform determining a viewer comment that was provided in response to the live content stream; converting text included in the comment to speech audio; and providing data corresponding to the speech audio to be outputted through the audio device.

In an embodiment, the speech audio is generated in response to the broadcaster selecting an option.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
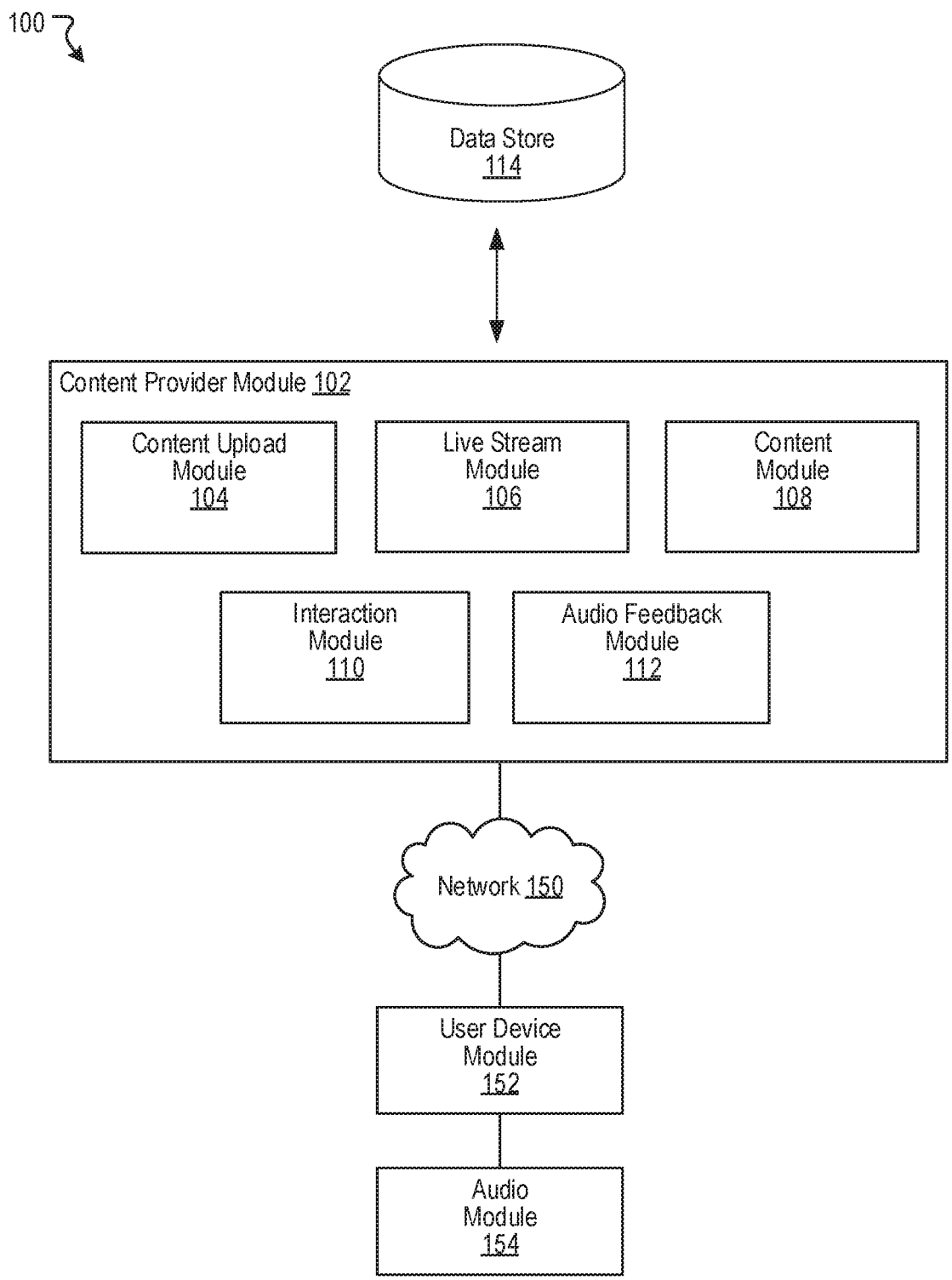
FIG. 1 illustrates an example system including an example content provider module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Approaches for Communicating Feedback

Today, people often utilize computing devices (or systems) for a wide variety of purposes. Users can use their computing devices to, for example, interact with one another, access content, share content, and create content. In some cases, content items can include postings from members of a social network. The postings may include text and live content streams, such as images, videos, and audio. The postings may be published to the social network for consumption by others.

Under conventional approaches, content may be broadcast through a content provider (e.g., social networking system) using various broadcast media (e.g., Internet broadcasting, etc.). In one example, a live content stream can include content that is being captured and streamed live by a user (e.g., a broadcaster). For example, the broadcaster can capture and stream an event (e.g., a live video of the broadcaster, concert, speech, etc.) as part of a live content stream. Such events can be captured using computing devices (e.g., mobile devices with audio and video capture capabilities) and/or standalone devices (e.g., video cameras and microphones). A user (e.g., a viewer) operating a computing device can access the live content stream through the content provider. The content provider encodes and provides data corresponding to the live content stream to the user's computing device over a network (e.g., the Internet)

in real-time. The computing device can decode and present the live content stream, for example, through a display screen of the computing device. In general, the live content stream continues to be provided to the user's computing device until the broadcaster discontinues broadcasting the live content stream or the user instructs the computing device to stop accessing the live content stream, for example. In some instances, users viewing the live content stream may want to interact with the broadcaster(s) of the live content stream. Such interaction can be limited under conventional approaches which typically do not provide features that allow viewers to interact with broadcasters. Accordingly, such conventional approaches may not be effective in addressing these and other problems arising in computer technology.

An improved approach rooted in computer technology overcomes the foregoing and other disadvantages associated with conventional approaches specifically arising in the realm of computer technology. In various embodiments, a content provider (e.g., social networking system) is configured to provide various options that allow users (or viewers) to interact with broadcasters of live content streams. For example, viewers of a live content stream can select an option to "like" a broadcaster's live content stream. In some embodiments, such viewer feedback can be transformed into audio-based feedback that is communicated to the broadcaster. For example, a particular type of audio-based feedback can be communicated to the broadcaster in response to a threshold number of likes from viewers of the broadcast. In such embodiments, the audio-based feedback can be provided to the broadcaster through an audio device that is configured to receive and output audio (e.g., a feedback headset, a feedback speaker, etc.). Many variations are possible.

FIG. 1 illustrates an example system 100 including an example content provider module 102, according to an embodiment of the present disclosure. As shown in the example of FIG. 1, the content provider module 102 can include a content upload module 104, a live stream module 106, a content module 108, an interaction module 110, and an audio feedback module 112. In some instances, the example system 100 can include at least one data store 114. A user device module 152 can interact with the content provider module 102 over one or more networks 150 (e.g., the Internet, a local area network, a cellular network, etc.). In some embodiments, the user is a member of a social network (e.g., the social networking system 630 of FIG. 6). In some embodiments, an audio module 154 can be configured to output audio data received from the content provider module 102 and/or the user device module 152. In such embodiments, the audio module 154 can be implemented in an audio device configured to process and output audio (e.g., a feedback headset, a feedback speaker, etc.). The components (e.g., modules, elements, etc.) shown in this figure and all figures herein are examples only, and other implementations may include additional, fewer, integrated, or different components. Some components may not be shown so as not to obscure relevant details.

In some embodiments, the content provider module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the content provider module 102 can be implemented, in part or in whole, as software running on one or more computing devices or systems, such as on a user or client computing device. In one example, the content provider module 102 and/or the user device module 152 or at least a portion thereof can be implemented as or within an application (e.g., app), a program, or an applet, etc., running on a user computing device or a client computing system, such as the user device 610 of FIG. 6. In another example, the content provider module 102 or at least a portion thereof can be implemented using one or more computing devices or systems that include one or more servers, such as network servers or cloud servers. In some instances, the content provider module 102 can, in part or in whole, be implemented within or configured to operate in conjunction with a social networking system (or service), such as the social networking system 630 of FIG. 6.

The content provider module 102 can be configured to communicate and/or operate with the at least one data store 114, as shown in the example system 100. The at least one data store 114 can be configured to store and maintain various types of data. For example, the data store 114 can store information describing various content that is being streamed live through the social networking system and/or content items that have been posted by users of the social networking system. In some implementations, the at least one data store 114 can store information associated with the social networking system (e.g., the social networking system 630 of FIG. 6). The information associated with the social networking system can include data about users, social connections, social interactions, locations, geo-fenced areas, maps, places, events, pages, groups, posts, communications, content, feeds, account settings, privacy settings, a social graph, and various other types of data. In some implementations, the at least one data store 114 can store information associated with users, such as user identifiers, user information, profile information, user specified settings, content produced or posted by users, and various other types of user data.

The content provider module 102 can be configured to provide users with access to content items that are posted through a social networking system. For example, a user can interact with an interface that is provided by a software application (e.g., a social networking application) running on a computing device of the user. This interface can include an option for posting, or uploading, content items to the social networking system. When posting a content item, the content upload module 104 can be utilized to communicate data describing the content item from the computing device to the social networking system. Such content items may include text, images, audio, and videos, for example. The social networking system can then provide the content item through the social networking system including, for example, in one or more news feeds.

In some embodiments, the interface provided by the software application can include an option for live streaming content through the social networking system. When initiating a live content stream, the live stream module 106 can be utilized to communicate data (e.g., audio data, video data, etc.) corresponding to the content to be streamed live from the computing device and through the social networking system. The live stream module 106 can utilize any generally known techniques that allow for live streaming of content including, for example, the Real Time Messaging Protocol (RTMP). In various embodiments, the computing device from which the live content stream is being provided can be equipped to capture data (e.g., video data, audio data, etc.) corresponding to the live content stream.

The interface provided by the software application can also be used to access posted content items, for example, using the content module 108. For example, the content module 108 can include content items in a user's news feed. Such content items may include on-demand content items (e.g., video on-demand or "VOD") as well as content that is being streamed live. In this example, the user can access content items while browsing the news feed. In another example, the user can access content items by performing searches through the interface. For example, the user can search for a given content item or live content stream, for a user that posted a content item or live content stream, and/or for search terms that correspond to a content item or live content stream. In one example, the user may select an option to view a live content stream and, in response, the social networking system can send data corresponding to the live content stream to a computing device of the user. In this example, the social networking system can continue sending data corresponding to the live content stream until, for example, the broadcaster of the live content stream discontinues streaming or if the user selects an option to discontinue playback of the live content stream.

In some embodiments, when the user accesses a content item (e.g., live content stream), the interface provided by the software application presents the live content stream through a display screen of the user's computing device. In some embodiments, the interface includes a number of options that can be selected to provide various types of feedback to a broadcaster of the live content stream. For example, a user may want to endorse, or "like", the live content stream. In this example, the user can select a "like" option provided in the interface to like, or endorse, the live content stream. The interaction module 110 can determine when a user likes a given content item (e.g., live content stream) and can store information describing this relationship. In some embodiments, the interface includes a set of options for reacting to content being presented in the live content stream. These options can include a "love" reaction option, a "haha" (or funny) reaction option, a "wow" (or surprised) reaction option, a "sad" reaction option, and an "angry" reaction option, to name some examples. Similarly, the interaction module 110 can determine when a user selects a reaction option in response to a given content item (e.g., live content stream) and can store information describing this relationship. The interaction module 110 can also determine when other forms of user interaction are performed and can store information describing such interactions (e.g., information describing a type of interaction, an identity of the user, an identity of the broadcaster, and the content item, to name some examples). For example, a viewer may want to post a comment in response to a live content stream. In this example, the viewer can select an option provided in the interface to enter and post the comment for the desired live content stream. The interaction module 110 can determine when a viewer posts a comment in response to a given live content stream and can store information describing this relationship. In some embodiments, the interaction module 110 can determine when users share a live content stream (or content item) with other users and can store information describing such relationships.

The audio feedback module 112 can be configured to provide audio-based feedback to broadcasters based on user interactions (e.g., likes, reactions, comments, shares, etc.) determined by the interaction module 110. More details regarding the audio feedback module 112 will be provided below with reference to FIG. 2.

In various embodiments, the user device module 152 can be configured to receive and output audio-based feedback data using the audio module 154. For example, the content provider module 102 can provide audio-based feedback data to the user device module 152 over the network 150. The user device module 152 can then output the audio-based feedback data through the audio module 154. In some embodiments, the user device module 152 can be implemented in a software application (e.g., social networking application) running on a computing device being operated by a given user, such as the user device 610 of FIG. 6. More details regarding the audio module 154 will be provided below with reference to FIG. 3.

Figure 2:
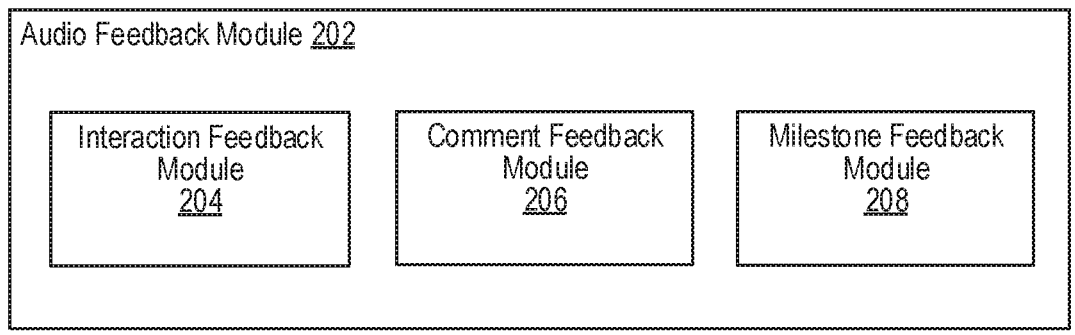
FIG. 2 illustrates an example of an audio feedback module, according to an embodiment of the present disclosure.

FIG. 2 illustrates an example of an audio feedback module 202, according to an embodiment of the present disclosure. In some embodiments, the audio feedback module 112 of FIG. 1 can be implemented as the audio feedback module 202. As shown in FIG. 2, the audio feedback module 202 can include an interaction feedback module 204, a comment feedback module 206, and a milestone feedback module 208.

The interaction feedback module 204 can be configured to provide audio-based feedback in response to various user interactions. In some embodiments, each interaction (e.g., like, reaction, comment, share, etc.) can be associated with some corresponding type of audio-based feedback. In general, the audio-based feedback may correspond to any type of sound and/or voice-based response. In such embodiments, audio-based feedback corresponding to a given type of interaction can be provided (e.g., played, reproduced, etc.) in response to a user selection of the interaction. For example, a user viewing a live content stream can select a like option to endorse the live content stream. In this example, audio-based feedback corresponding to the like option can be provided to a broadcaster of the live content stream through an audio device. Similarly, a user selection of a happy reaction option can result in audio-based feedback corresponding to the happy reaction option being provided to the broadcaster. In some embodiments, the broadcaster can be provided some type of audio-based feedback in response to a viewer commenting on the live content stream. Such audio-based feedback, therefore, provides the broadcaster with an audible indication of the types of interactions being submitted by viewers of the live content stream. In general, audio-based feedback corresponding to one or more interactions can be encoded as an audio file that is formatted using generally known techniques. This audio file can be provided to the broadcaster's audio device when users select the interaction(s). In some embodiments, such audio files are provided and stored on the broadcaster's computing device and/or audio device.

In some embodiments, the comment feedback module 206 can be configured to convert text-based comments into audio. This audio can then be provided to a broadcaster of the live content stream through an audio device. As a result, a comment can be reviewed by the broadcaster by listening to the comment rather than having to read the comment. In various embodiments, the comment feedback module 206 can utilize generally known text-to-speech techniques to convert text from comments to synthesized audio output complete with appropriate cadence and intonation. In some embodiments, when converting comment text to audio, the comment feedback module 206 can generate speech audio in the language in which the comment was written. In some embodiments, when converting comment text to audio, the comment feedback module 206 can generate speech audio in a language preferred by the broadcaster despite the language in which the comment was originally written. In some instances, there may be many viewers that post comments with respect to a given live content stream. In some embodiments, these comments can be queued based on the order in which they were submitted. In such embodiments, these comments can be converted to audio and provided to a broadcaster of the live content stream in the order in which they were submitted. In some embodiments, users that submit comments can select an option to have their comment be read to the broadcaster. In such embodiments, comments selected to be read to the broadcaster can be queued and read based on the order in which they were submitted. In some embodiments, a broadcaster of a live content stream can select (or tag) comments to be read to the broadcaster through an audio device.

The milestone feedback module 208 can be configured to provide audio-based feedback in response to various milestones (e.g., a threshold number of viewer interactions, a threshold number of viewer interactions of a given type, etc.). For example, in some embodiments, audio-based feedback (e.g., audio that reproduces clapping) can be provided when viewers of a live content stream have selected a threshold number of options for interacting with the live content item (e.g., a threshold number of likes, reactions, comments, shares, etc.). In some instances, the audio-based feedback can vary depending on the type of user interaction. For example, one type of audio-based feedback (e.g., audio that reproduces cheering) can be provided in response to a threshold number of interactions of some type (e.g., threshold number of likes). In this example, another type of audio-based feedback (e.g., audio that reproduces a siren) can be provided in response to a threshold number of interactions of some other type (e.g., threshold number of happy reactions). In some embodiments, the milestone feedback module 208 can be configured to provide some type of audio-based feedback in response to a threshold number of comments being posted with respect to the live content stream. Similarly, the milestone feedback module 208 can be configured to provide some other type of audio-based feedback in response to the live content stream being shared a threshold number of times.

Figure 3:
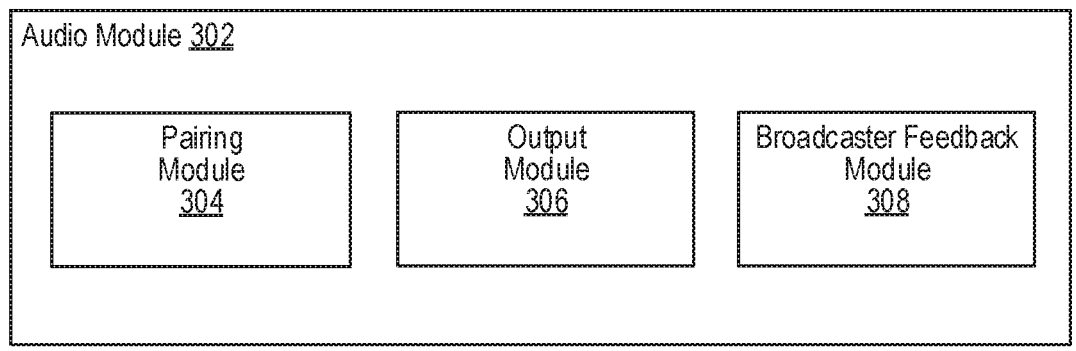
FIG. 3 illustrates an example of an audio module, according to an embodiment of the present disclosure.

FIG. 3 illustrates an example of an audio module 302, according to an embodiment of the present disclosure. In some embodiments, the audio module 154 of FIG. 1 can be implemented as the audio module 302. As shown in FIG. 3, the audio module 302 can include a pairing module 304, an output module 306, and a broadcaster feedback module 308.

The pairing module 304 can be configured to pair an audio device (e.g., a feedback headset, feedback speaker, etc.) with a computing device. For example, in some embodiments, the audio module 302 can be implemented in or for an audio device configured to process and output audio. This audio device may be paired to a computing device being used to broadcast a live content stream through a content provider (e.g., social networking system). In general, any known technique may be used to enable electronic communication between the computing device and the audio device including Bluetooth, Wi-Fi, infrared (IR) communication, to name some examples.

The output module 306 can be configured to output audio-based feedback. For example, an audio device in or for which the output module 306 is implemented can be paired with a computing device, as described above. Once paired, the audio device can be used to output audio-based feedback based on viewer interactions with the live content stream, as described above. In some embodiments, the audio-based feedback is provided by a content provider (e.g., social networking system). In some embodiments, data corresponding to the audio-based feedback is stored on the audio device. In such embodiments, various audio-based feedback can be outputted in response to instructions provided by the content provider.

The broadcaster feedback module 308 can be configured to provide audio-based feedback to viewers of a live content stream. For example, in some embodiments, a broadcaster of a live content stream can specify various audio-based feedback to be communicated to viewers of the live content stream. For example, the broadcaster may want viewers to hear a particular sound. In general, different sounds may be played to engage viewers and/or to encourage viewers to perform various actions. For example, a particular sound may be played to encourage viewers to select an option (e.g., a like option, reaction option, comment option, etc.) for interacting with the live content stream. In some embodiments, this audio-based feedback may be specified by selecting options (or buttons) provided on the audio device in which the audio module 302 is implemented. For example, the audio device may include a number of buttons that can each be selected to provide some form of audio-based feedback to viewers of a live content stream. When a button is selected, the broadcaster feedback module 308 can determine the audio-based feedback that is associated with the selected button. The broadcaster feedback module 308 can then instruct a content provider (e.g., social networking system) through which the live content stream is being broadcasted to reproduce the audio-based feedback to the viewers. The instruction can be communicated from the audio module 302 to a paired computing device, which in turn can communicate the instruction to the content provider. The content provider can send the audio-based feedback (or an encoded version thereof) to computing devices that are streaming the broadcast along with instructions to output the audio-based feedback for the viewers associated with the computing devices.

Figure 4:
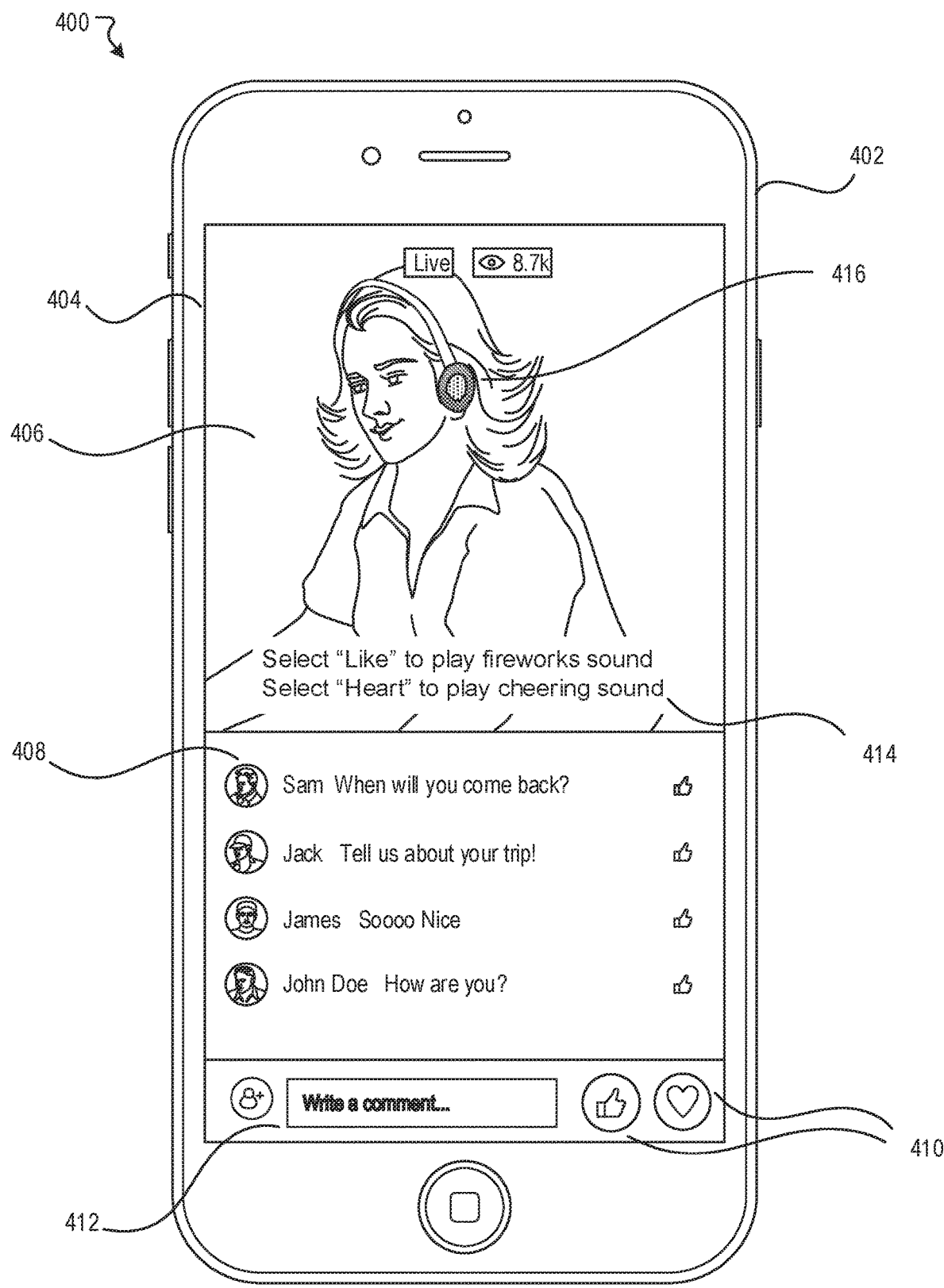
FIG. 4 illustrates an example interface for interacting with live content streams, according to an embodiment of the present disclosure.

FIG. 4 illustrates an example 400 of an interface 404 for interacting with a broadcaster of a live content stream, according to an embodiment of the present disclosure. The interface 404 is presented on a display screen of a computing device 402 of a user viewing the live content stream. The interface 404 may be provided through an application (e.g., a web browser, a social networking application, etc.) running on the computing device 402. In this example, the interface 404 includes a region 406 in which the live content stream being accessed is displayed. The interface 404 also includes a region 408 in which comments posted by various users in response to the live content stream are displayed. The region 408 also includes a field 412 through which the user operating the computing device can input comments to be posted in the region 408. The region 408 also includes a number of feedback options 410 (e.g., like option, reaction options, etc.) that can be selected. In some embodiments, selecting feedback options 410, inputting comments, and/or sharing the live content stream can result in various types of audio-based feedback to be provided to the broadcaster of the live content stream. In some instances, the live content stream can include instructions 414 indicating the actions that can be performed to communicate various types of audio-based feedback to the broadcaster through an audio device 416.

Figure 5:
FIG. 5 illustrates an example process, according to various embodiments of the present disclosure.
Figure 5:

FIG. 5 illustrates an example process 500, according to various embodiments of the present disclosure. It should be appreciated that there can be additional, fewer, or alternative steps performed in similar or alternative orders, or in parallel, within the scope of the various embodiments discussed herein unless otherwise stated.

At block 502, a determination is made that one or more viewers of a live content stream selected at least one option for interacting with a broadcaster of the live content stream. At block 504, audio-based feedback corresponding to the selected option is determined. At block 506, the audio-based feedback is provided to be outputted to the broadcaster through an audio device.

It is contemplated that there can be many other uses, applications, and/or variations associated with the various embodiments of the present disclosure. For example, in some cases, user can choose whether or not to opt-in to utilize the disclosed technology. The disclosed technology can also ensure that various privacy settings and preferences are maintained and can prevent private information from being divulged. In another example, various embodiments of the present disclosure can learn, improve, and/or be refined over time.

Social Networking System—Example Implementation

Figure 6:
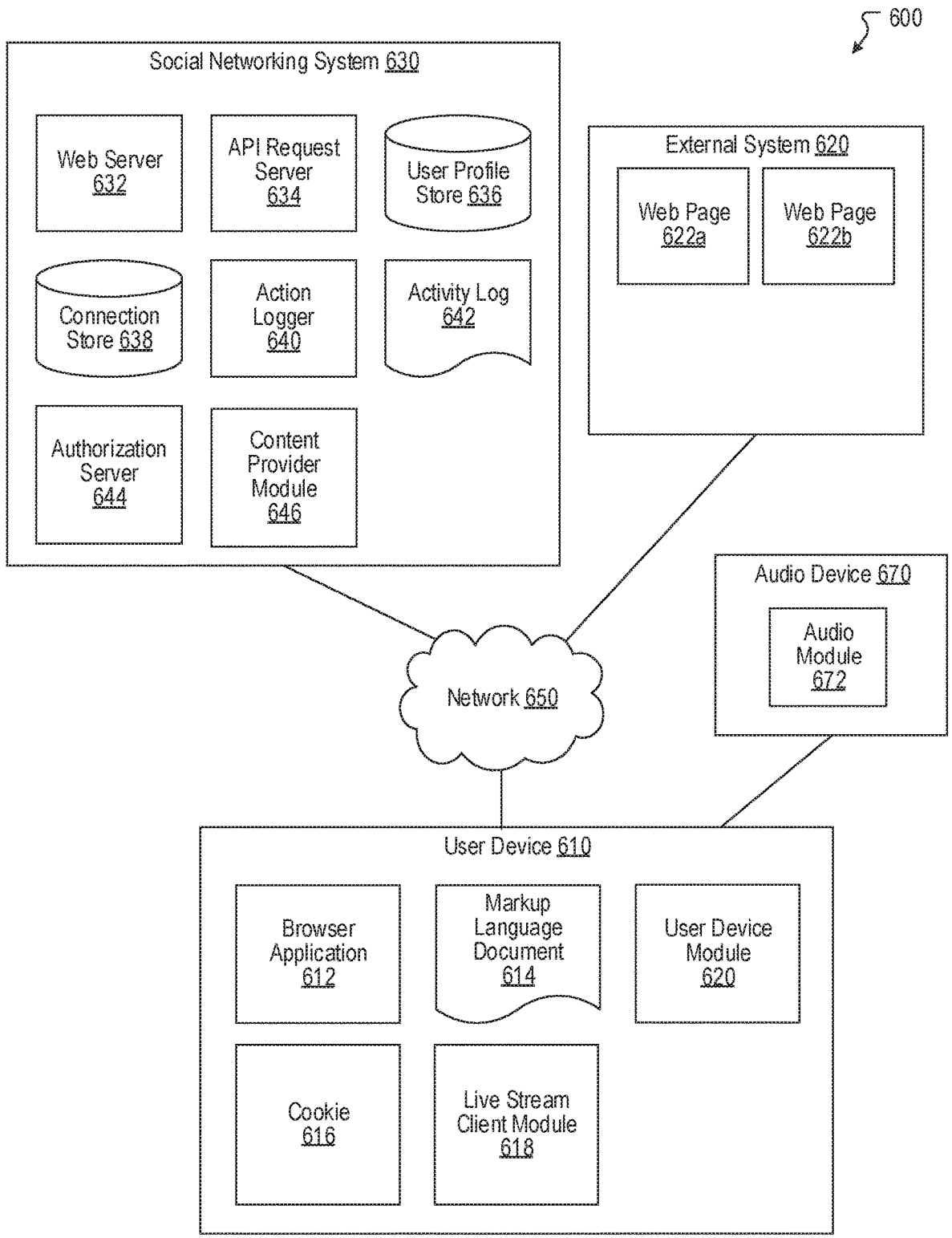
FIG. 6 illustrates a network diagram of an example system including an example social networking system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices (or systems) that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a computing device or a device having computer functionality, such as a smart-phone, a tablet, a personal digital assistant (PDA), a mobile telephone, a laptop computer, a wearable device (e.g., a pair of glasses, a watch, a bracelet, etc.), a camera, an appliance, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the Silverlight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content. As discussed previously, it should be appreciated that there can be many variations or other possibilities.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a content provider module 646. The content provider module 646 can, for example, be implemented as the content provider module 102 of FIG. 1. In some embodiments, the user device 610 can include a live stream client module 618 and a user device module 620. The live stream client module 618 can be configured to interact with the live stream module 106, for example, for purposes of streaming live content captured by the user device 610. The live stream client module 618 can implement any generally known techniques that allow for live streaming of content including, for example, the Real Time Messaging Protocol (RTMP). The user device module 620 can be implemented as the user device module 152 of FIG. 1. In some embodiments, the user device 610 can be paired to an audio device 670, which can be implemented as described herein. An audio module 672 can be implemented in (or for) the audio device 670. In some embodiments, the audio module 672 can be implemented with the audio module 154. As discussed previously, it should be appreciated that there can be many variations or other possibilities.

Hardware Implementation

Figure 7:
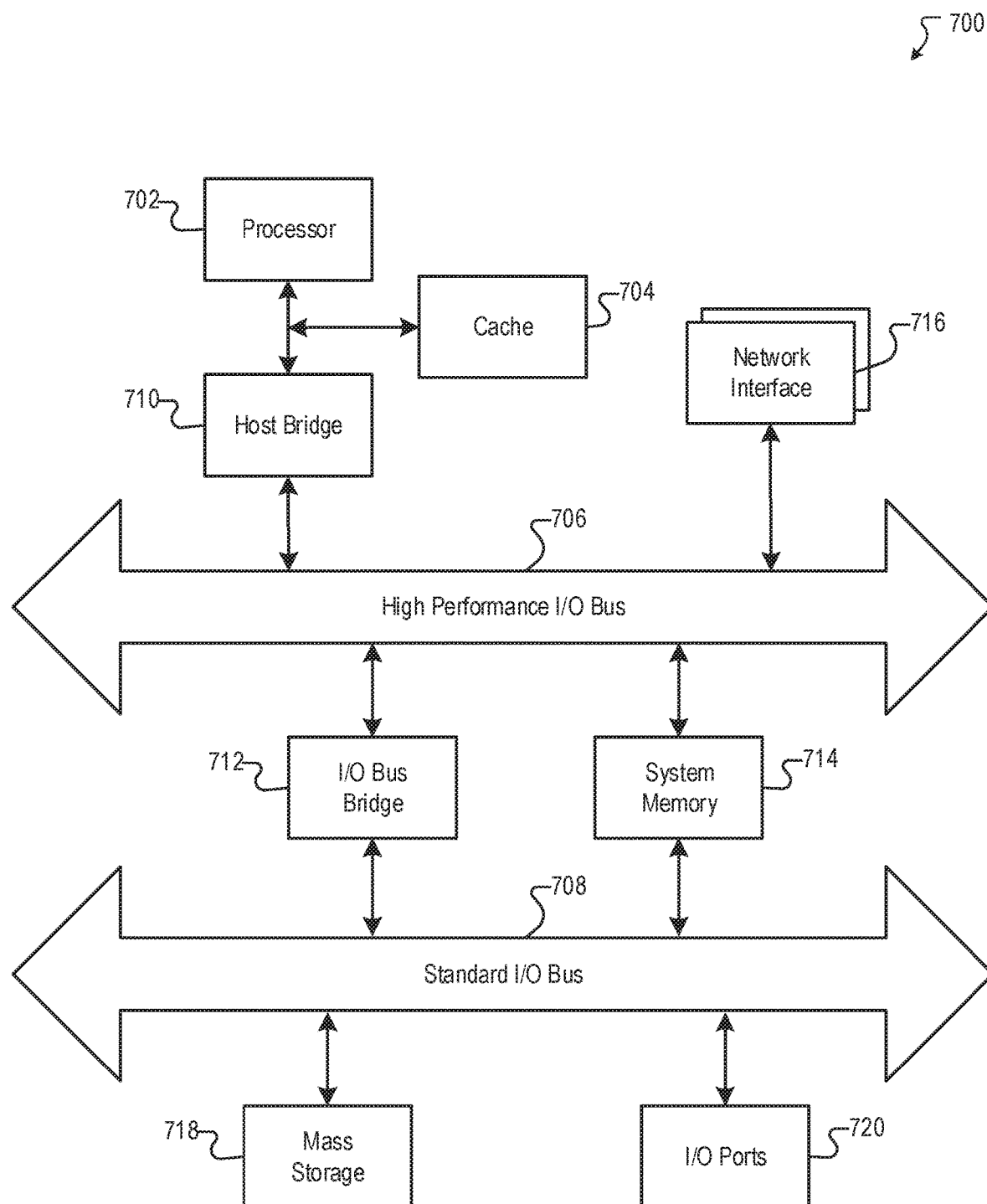
FIG. 7 illustrates an example of a computer system or computing device that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
   associating, by a computing system, a plurality of audio-based feedback with a plurality of selectable options for interacting with viewers of a live content stream, wherein the plurality of selectable options are provided on an audio device of a broadcaster of the live content stream, wherein each of the plurality of audio-based feedback is indicative of a different type of user interaction associated with a corresponding selectable option of the plurality of selectable options;
   determining, by the computing system, that the broadcaster of the live content stream selected at least one option from the selectable options for interacting with the viewers of the live content stream;
   determining, by the computing system, audio-based feedback associated with the selected option; and
   providing, by the computing system, the audio-based feedback to be outputted to the viewers through computing devices operable by the viewers.

2. The computer-implemented method of claim 1, wherein the selectable options for interacting with the viewers include at least one of: a like option, a reaction option, a comment option, or a share option.

3. The computer-implemented method of claim 1, wherein the live content stream is broadcasted through a social networking system.

4. The computer-implemented method of claim 1, wherein the audio device is paired with a computing device being operated by the broadcaster.

5. The computer-implemented method of claim 4, wherein the live content stream is being broadcasted through the computing device.

6. The computer-implemented method of claim 1, the method further comprising:
   determining, by the computing system, that a threshold number of viewers selected at least one different option for interacting with the broadcaster; and
   providing, by the computing system, different audio-based feedback to be outputted to the broadcaster through the audio device, the different audio-based feedback being associated with the different option.

7. The computer-implemented method of claim 1, the method further comprising:
   determining, by the computing system, that the broadcaster has selected at least one different option to interact with the viewers of the live content stream; and
   providing, by the computing system, different audio-based feedback to be outputted through the computing devices being operated by the viewers, the different audio-based feedback being associated with the selected different option.

8. The computer-implemented method of claim 7, wherein the different option is selected through the audio device.

9. The computer-implemented method of claim 1, the method further comprising:
   determining, by the computing system, a viewer comment that was provided in response to the live content stream;
   converting, by the computing system, text included in the viewer comment to speech audio; and
   providing, by the computing system, data corresponding to the speech audio to be outputted through the audio device.

10. The computer-implemented method of claim 9, wherein the speech audio is generated in response to the broadcaster selecting an option.

11. A system comprising:
    at least one processor; and
    a memory storing instructions that, when executed by the at least one processor, cause the system to perform:
       associating a plurality of audio-based feedback with a plurality of selectable options for interacting with viewers of a live content stream, wherein the plurality of selectable options are provided on an audio device of a broadcaster of the live content stream, wherein each of the plurality of audio-based feedback is indicative of a different type of user interaction associated with a corresponding selectable option of the plurality of selectable options;
       determining that the broadcaster of the live content stream selected at least one option from the selectable options for interacting with the viewers of the live content stream;
       determining audio-based feedback associated with the selected option; and
       providing the audio-based feedback to be outputted to the viewers through computing devices operable by the viewers.

12. The system of claim 11, wherein the selectable options for interacting with the viewers include at least one of: a like option, a reaction option, a comment option, or a share option.

13. The system of claim 12, wherein the live content stream is broadcasted through a social networking system.

14. The system of claim 12, wherein the audio device is paired with a computing device being operated by the broadcaster.

15. The system of claim 14, wherein the live content stream is being broadcasted through the computing device.

16. A non-transitory computer-readable storage medium including instructions that, when executed by at least one processor of a computing system, cause the computing system to perform a method comprising:
- associating a plurality of audio-based feedback with a plurality of selectable options for interacting with viewers of a live content stream, wherein the plurality of selectable options are provided on an audio device of a broadcaster of the live content stream, wherein each of the plurality of audio-based feedback is indicative of a different type of user interaction associated with a corresponding selectable option of the plurality of selectable options;
- determining that the broadcaster of the live content stream selected at least one option from the selectable options for interacting with the viewers of the live content stream;
- determining audio-based feedback associated with the selected option; and
- providing the audio-based feedback to be outputted to the viewers through computing devices operable by the viewers.

17. The non-transitory computer-readable storage medium of claim 16, wherein the selectable options for interacting with the viewers include at least one of: a like option, a reaction option, a comment option, or a share option.

18. The non-transitory computer-readable storage medium of claim 17, wherein the live content stream is broadcasted through a social networking system.

19. The non-transitory computer-readable storage medium of claim 16, wherein the audio device is paired with a computing device being operated by the broadcaster.

20. The non-transitory computer-readable storage medium of claim 19, wherein the live content stream is being broadcasted through the computing device.

* * * * *